(12) United States Patent
Wray

(10) Patent No.: US 6,715,606 B2
(45) Date of Patent: Apr. 6, 2004

(54) STORAGE DEVICE FOR COMPACT DISCS AND THE LIKE

(76) Inventor: Robert P. Wray, 537 Princeton Dr., King of Prussia, PA (US) 19406

( * ) Notice: Subject to any disclaimer, the term of this patent is extended or adjusted under 35 U.S.C. 154(b) by 125 days.

(21) Appl. No.: 09/981,118

(22) Filed: Oct. 17, 2001

(65) Prior Publication Data

US 2003/0070945 A1 Apr. 17, 2003

(51) Int. Cl.[7] .............................................. B65D 85/57
(52) U.S. Cl. ..................................... 206/308.1; 211/40
(58) Field of Search ............................. 206/307, 308.1, 206/309, 307.1; 211/40, 411.12; 312/9.9, 9.64

(56) References Cited

U.S. PATENT DOCUMENTS

| 4,778,047 A | 10/1988 | Lay |
| 5,176,250 A | 1/1993 | Cheng |
| 5,201,414 A | 4/1993 | Kaszubinski |
| 5,246,107 A | 9/1993 | Long et al. |
| 5,456,368 A | 10/1995 | Zehnder |
| 5,474,170 A | 12/1995 | Erickson |
| 5,586,650 A | 12/1996 | Yeh |
| 5,590,770 A | 1/1997 | Yeh |
| 5,823,332 A | * 10/1998 | Clausen ................ 206/307.1 |
| 5,833,062 A | 11/1998 | Yeh |
| 5,860,712 A | 1/1999 | Nielsen |
| 5,906,275 A | 5/1999 | Jokic |
| 5,915,549 A | 6/1999 | Palmer et al. |
| 5,996,785 A | 12/1999 | Palmer et al. |
| 6,073,764 A | * 6/2000 | Haas et al. ............ 206/308.1 |
| 6,075,758 A | 6/2000 | Wu |
| 6,086,170 A | 7/2000 | Chen |
| D437,521 S | * 2/2001 | Leung ..................... D6/635 |

* cited by examiner

Primary Examiner—Shian Luong
(74) Attorney, Agent, or Firm—Frank J. Bonini, Jr.; John F. A. Farley III; Harding, Earley, Follmar & Frailey

(57) ABSTRACT

A device for storing and holding compact discs with a holder member which carries a disc, and optionally, a jacket or other information identifying the disc, a tray in which one or more holder members are releaseably mounted for storing compact discs, the holder member having a body portion on which the disc is held and a flexible membrane connecting the body portion to a retaining member, the retaining member being secured in the tray, thereby permitting flipping of the holder member to facilitate identification and selection of a compact disc.

31 Claims, 9 Drawing Sheets

STORAGE DEVICE FOR COMPACT DISCS AND THE LIKE

BACKGROUND OF THE INVENTION

1. Field of the Invention

The present invention relates to the field of storage devices, and in particular, a storage device for compact discs (CD's), digital video discs (DVD's), and the like.

2. Brief Description of the Related Art

Compact discs are widely and popularly used for storage of readable and recordable information thereon. The information can consist of music, computer software, or video. Discs containing music or software are generally referred to as compact discs or CD's. Discs containing video are commonly referred to as digital video discs or DVD's. These discs are all referred to herein by the term "compact disc". Compact discs are usually marketed for sale in a protective holder called a jewel case. The jewel case has a prong or hub for holding the disc. The compact disc structure generally comprises a round, flat diskette with a circular hole in the center of the diskette. The circular hole is configured for positioning on a rotating spindle of a player device, such as a compact disc player, digital video disc player, computer disc drive or the like. The prongs of the jewel case are generally configured to retain the disc by protruding into the disc's circular hole and compressively engaging the inner edge of the disc portion defining the hole.

The jewel case generally contains information concerning the CD. For example, the information may be contained on the spine of the jewel case or, most preferably, and in addition thereto, is provided in the form of a pamphlet or paper material which is inserted and held on the front of the jewel case. The front of the jewel case comprises a clear plastic panel so that the information pamphlet or paper is visible through the panel to identify a CD contained therein.

Storing a CD in a jewel case is suitable for marketing and distribution of a CD. However, when an individual needs to store more than a single CD and have the CD readily available for use, the jewel cases can prove cumbersome, since jewel cases are typically designed to hold a single CD. Turning to an example of a user desiring to listen to music on more than one CD, with present jewel cases, the user is required to open a jewel case, pull the CD out, and return it to the same case and then find another jewel case which has the next CD in it, and take the CD out of that jewel case for use. There are situations where it is desirous to readily and quickly locate and deploy a particular CD. While, if the particular CD is stored in one of several jewel cases, it may be difficult to readily locate the correct jewel case. Furthermore, once the jewel case is located, it must be opened, and the CD removed, in order to make the CD available for use. In some cases, a disc jockey, or DJ as this individual is sometimes referred to, will often take out several CD's from their storage cases. The result can be that the CD's are stacked in a pile and not even returned to the corresponding jewel cases. Since a DJ must play tracks from more than one CD, and many times takes requests, there is not a lot of time to spend organizing the CD's so that they are each returned to their jewel case after a use.

Therefore, some alternatives to a jewel case include providing a storage device for holding CD's. One such example is found in U.S. Pat. Nos. 5,915,549 and 5,996,785 both of which disclose a "Detachable Module Disc and Flat Object Storage System."

U.S. Pat. No. 4,778,047 entitled "Laser Disc Storage Container" provides an apparatus for storing discs to facilitate the display of discs using spring member appendages on the tray to bias the disc into a display angle when case is open. U.S. Pat. No. 5,246,107 entitled "Wallet Style Compact Disc Storage Unit" discloses a wallet style case for holding compact discs which has an accordion style holding member having faces connected by hinges.

U.S. Pat. Nos. 5,586,650 and 5,590,770, both entitled "CD Bank", provide a case with a hinged cover with a plurality of CD holder plates. The case of the CD bank device has longitudinal rails which receive and hold spring rods to maintain the holders within the case. A similar device is disclosed in U.S. Pat. No. 5,833,062 entitled "Disc Organizer".

A "Compact Disc Storage Apparatus" is disclosed in U.S. Pat. No. 5,201,414 which has rollers positioned in respective grooves to hold a CD holder within a case. U.S. Pat. No. 5,906,275 discloses a "Storage Unit for Compact Disc" which has a flexure hinge to allow a support panel holding a CD to pivot from a first position to a second position which lifts the CD off of its initial base or resting position.

Other examples of CD storing and/or holding devices are shown in U.S. Pat. Nos. 6,086,170; 6,075,758; 5,860,712; 5,474,170; 5,456,368; and 5,176,250.

A need exists for a device which will facilitate the storage, retrieval, and identification of discs, such as, for example, compact discs, computer discs, video discs, or digital video discs.

SUMMARY OF THE INVENTION

A novel storage device is provided for storing a plurality of compact discs for retrieval, identification, and use. The device has a supporting structure, such as a tray, and preferably a cover to maintain the discs in a safe environment for storage, transport, and use. A plurality of holder members are provided. Each holder member is configured for mounting in the tray and is adapted to hold a CD, and optionally can be configured to hold both a CD, and related material, such as, for example, the CD insert or jacket cover or other information. Each holder member may have elements to releasbly retain the CD on the holder member. In the case where the holder member is configured for holding a CD and a CD jacket material, holding elements are provided for retaining the CD jacket as well. The holding member is preferably connected to a retaining member with a pair of flexible leg members. The flexible leg members facilitate flipping of the CD and any information held on a holder member when the holder member is mounted in a tray.

The invention further can be optionally configured with a biasing mechanism for facilitating the flipping of the CD from a forward position to a rearward position or likewise from a rearward position to a forward position. It is an object of the present invention to provide a novel CD holder for storing CD's for facilitating identification and use of the CD's stored therein.

It is a further object of the present invention to provide a plurality of holder members which are configured to be installed in a supporting structure, such as, for example, a tray for holding a plurality of CD's therein.

It is a further object of the present invention to accomplish the above objects by providing a holder member which can hold a CD and corresponding CD identifying material, such as a CD jacket, for facilitating identifying or locating a CD among a plurality of CD's.

It is a further object of the present invention to provide a CD storage device which has a holder for storing CD's and/or corresponding related CD identifying material, such as a CD jacket, where the holder is supported by a flexible membrane for facilitating flipping of CD's held by the device.

It is a further object of the present invention to provide a biasing mechanism for moving the holder members and CD's held thereon to a forward or rearward position within the tray.

It is another object of the present invention to minimize the handling necessary for removing and storing a compact disc in a holder in order to decrease the potential for damage to the compact disc.

It is another object of the present invention to provide a novel storage device which facilitates storing and removing compact discs with a one-handed operation.

It is a further object of the present invention to provide a novel compact disc storage device which comprises materials which will minimize the potential for scratching compact discs as the discs are inserted into or removed from the device.

It is a further object of the present invention to provide a storage device which is comprised of a material which resists static electricity, and therefore minimizes the accumulation of dust on or in proximity to the compact discs being stored in the device.

It is a further object of the present invention to provide a storage device having holders which can hold a compact disc, or both a compact disc and a compact disc jacket.

It is a further object of the present invention to provide a storage device having a first type of holder which can hold a compact disc, and a second type of holder which can hold both a compact disc and a compact disc jacket, and further where both the first type of holder and second type of holder can be utilized by the storage device, separately or together.

It is another object of the present invention to provide a first type of holder member which can hold a compact disc and a second type of holder member which may be optionally attached to the first type of holder member, and which may hold information pertaining to the disc carried by the first type of holder member.

BRIEF DESCRIPTION OF THE DRAWING FIGURES

DETAILED DESCRIPTION OF THE PREFERRED EMBODIMENTS

Figure 1:
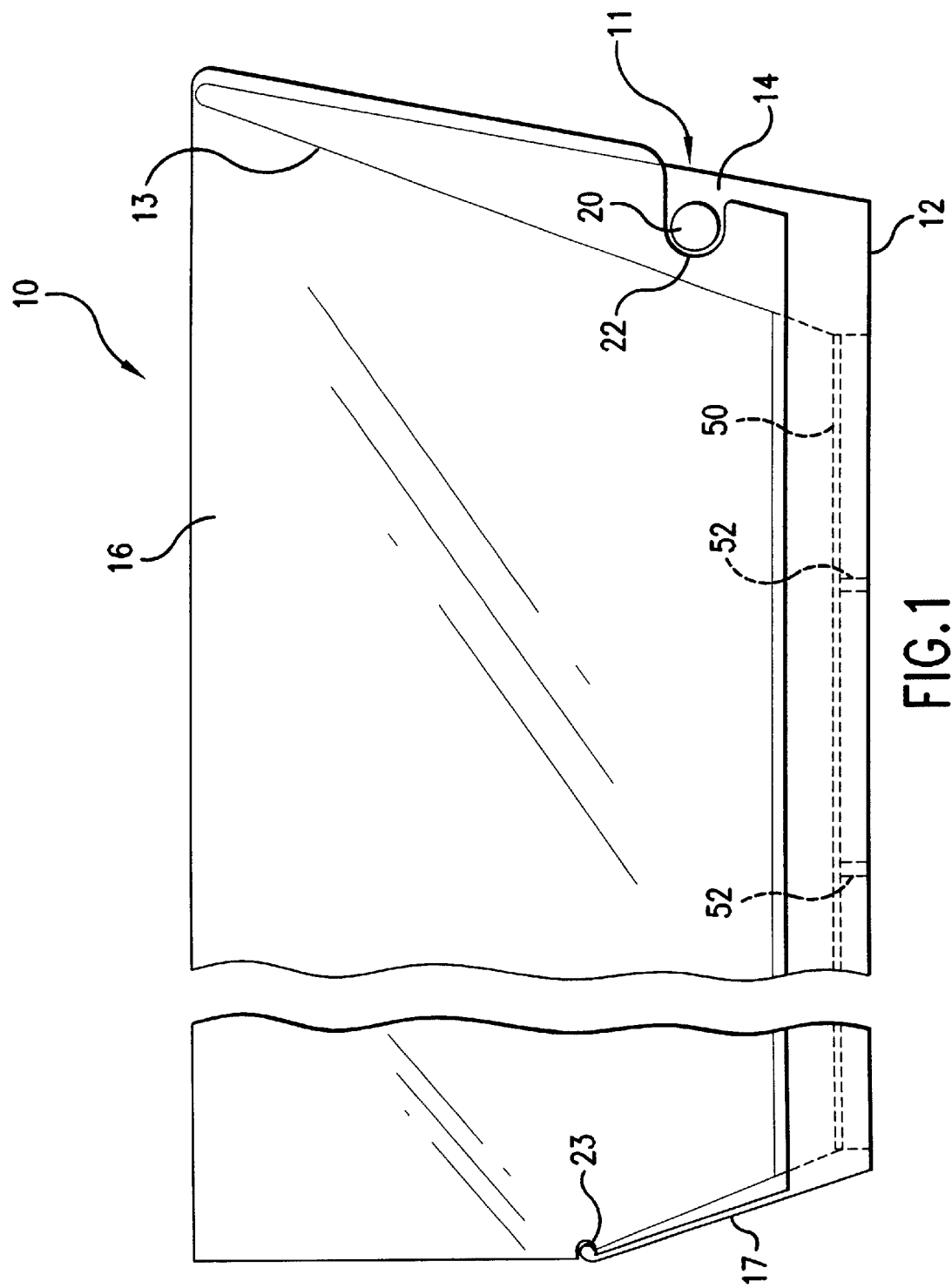
FIG. 1 is a side elevation view of a preferred embodiment of a storage device for holding compact discs constructed in accordance with the present invention.
Figure 2:
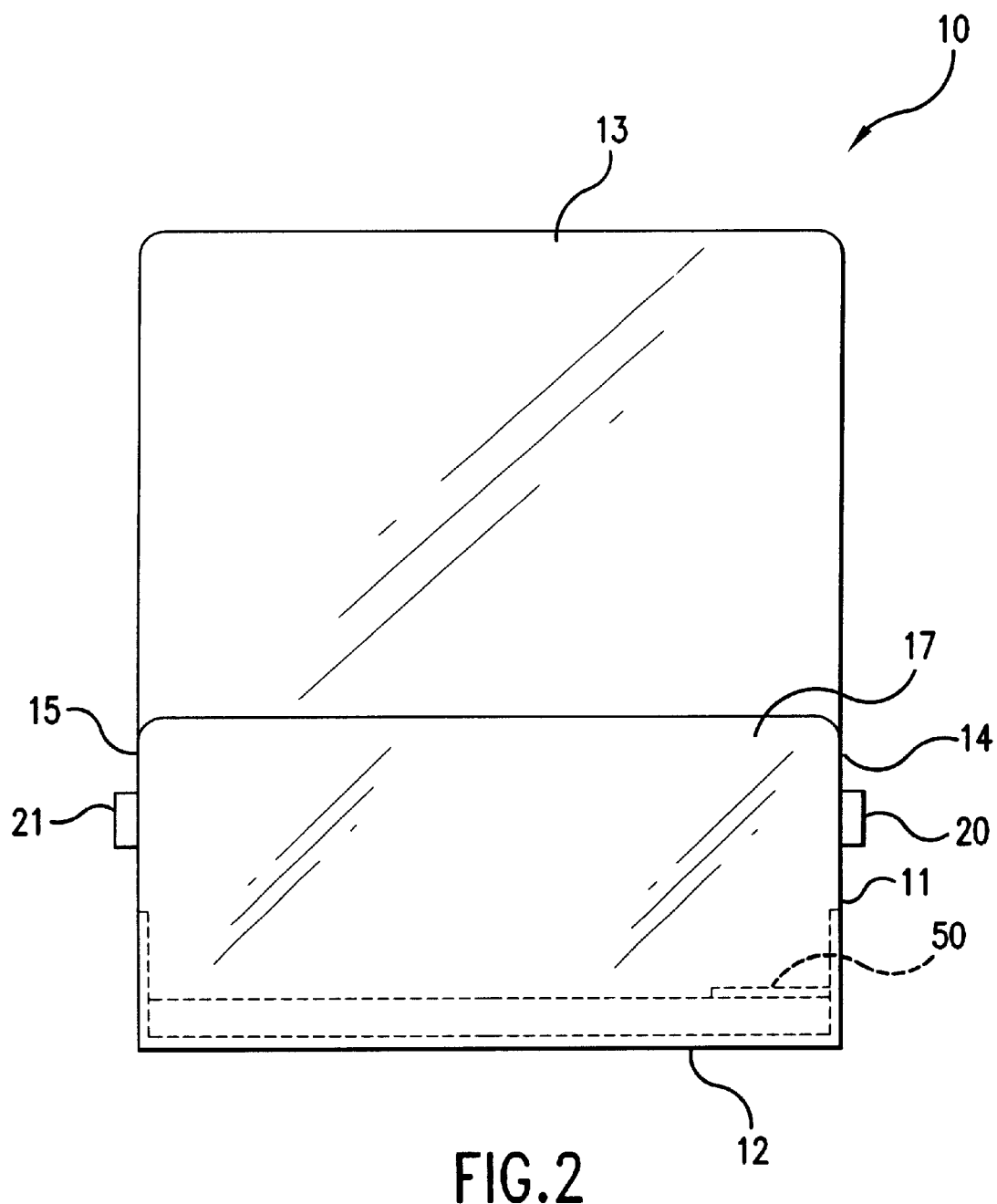
FIG. 2 is a front elevation, separate view illustrating an example of a supporting structure shown as a tray, constructed in accordance with a preferred embodiment of a storage device for holding compact discs illustrated in FIG. 1.

Referring now to the drawing figures, there is illustrated a device for storing and holding compact discs 10 constructed in accordance with the present invention. The device 10 is shown in FIGS. 1 and 2 with a supporting structure, such as, for example, a base comprising a tray 11 with a bottom 12, a rear wall 13, a first side wall 14, a second side wall 15 and a front wall 17. A cover 16 (FIG. 2) is preferably hinged to the rear wall 13 of the tray 11, and serves to further protect the compact discs held therein from dust, dirt, and other debris. Preferably a suitable hinging means, such as the pins 20, 21 is used for hingeably connecting the cover 16 with the tray 11. In the preferred embodiment shown, the cover 16 pivots about the pins 20, 21 to allow access to the container contents. For example, the cover 16 preferably can comprise a clear material so that the contents of the tray 11 (the compact discs held therein) are visible even when the cover 16 is closed. The cover 16 preferably has recesses 22 (only one being shown) formed on each side thereof for facilitating pivotal mounting of the cover on the tray 16, as shown in FIG. 2. Preferably, the cover 16 is removably mounted on the tray 11 so that the cover can be removed in its entirety for facilitating repeated access to the contents of the tray 11. The cover 16 preferably has a fastening element, such as, for example, the lip 23 shown formed in the front 17 of the cover 16 to facilitate securing the cover 16 to the tray 11. Although not shown, it will be understood that a lock may be employed in conjunction with the device 10 to permit a user of the device 10 to selectively lock the cover 16 with the tray 11.

Figure 3:
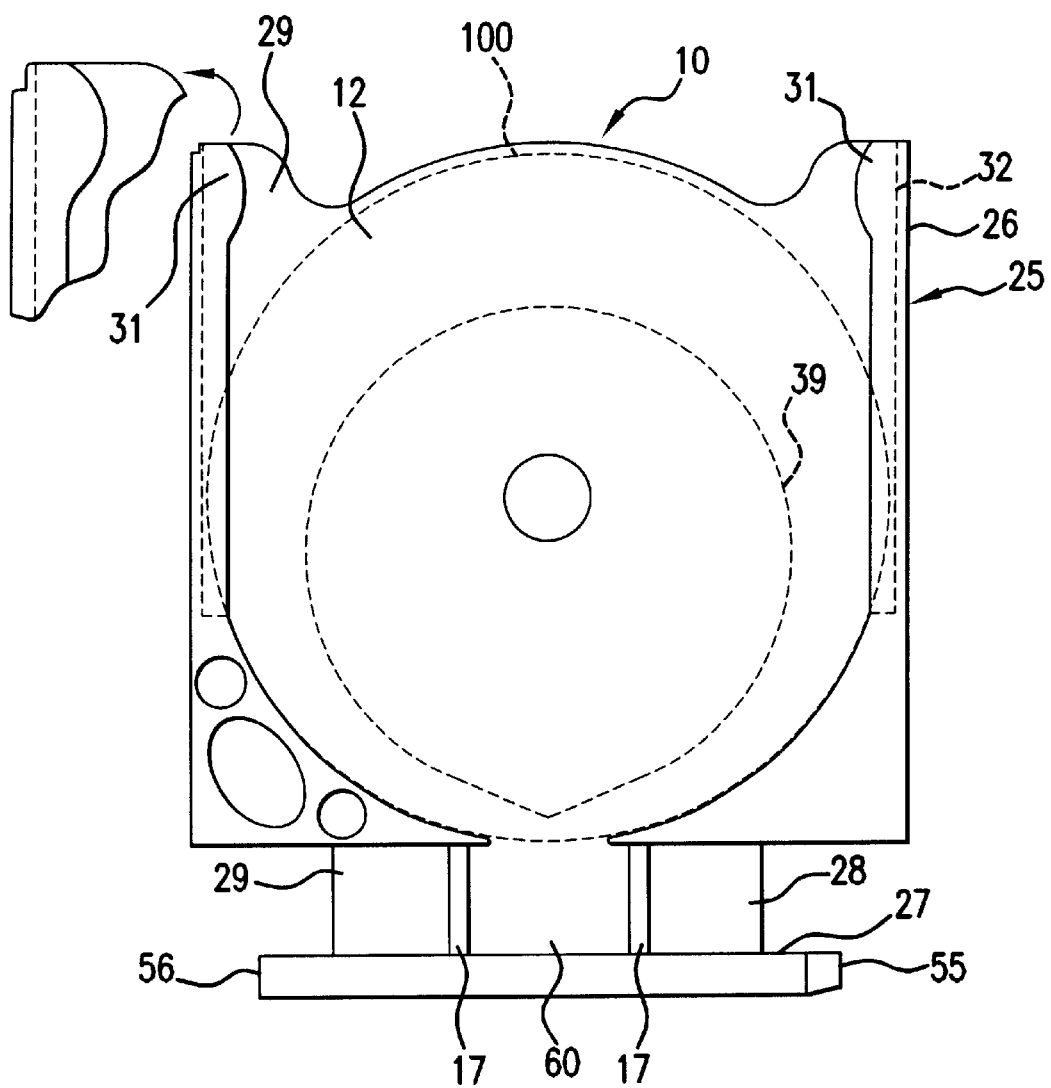
FIG. 3 is a front elevation view of a holder member constructed in accordance with the present invention.
Figure 4:
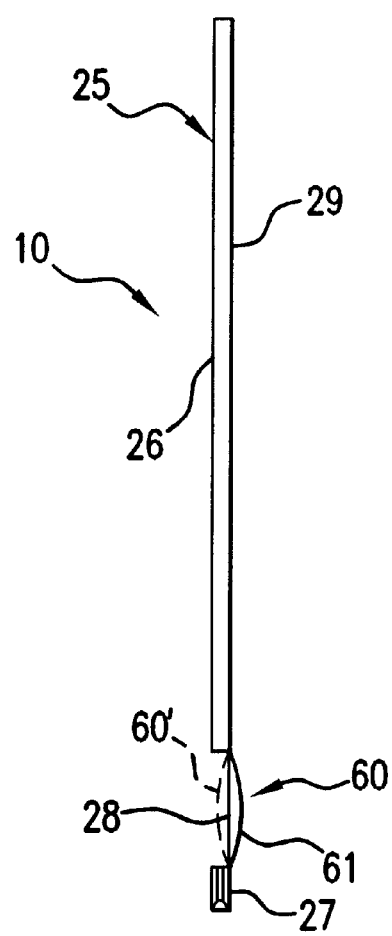
FIG. 4 is a right side elevation view of the holder member shown in FIG. 3.

Referring to FIG. 3, the device 10 is shown comprising holding means for holding a compact disc. The holding means preferably is illustrated comprising a holder member 25 having a body portion 26 for holding a compact disc, such as, for example, the disc 100. Retaining means is provided to releasably secure the holder member 25 to a supporting structure, such as, for example the tray 11 (FIGS. 1 and 4). The retaining means preferably may comprise a retaining member 27, as illustrated in FIGS. 3 and 4.

Flexible means for connecting the holder member body portion 26 with the retaining member 27 is shown comprising a flexible membrane configured in accordance with a preferred embodiment of the present invention to comprise a first leg element 28 and a second leg element 29 which are spaced apart from each other. Each of the first leg element 28 and second leg element 29 is connected at a first end thereof to the holder member body portion 26 and at a second end to the retaining member 27. Each leg element 28, 29 can be separately formed, or, alternately, can be integrally provided with the body portion 26 or the retaining member 27, or both.

The flexible membrane comprising the first leg element 28 and second leg element 29 may be comprised of a suitable material which is both strong enough to withstand the weight of the holder body 26 and any contents held by the holder body 26, and also flexible to permit the holder body 26 to be flipped relative to the retaining member 27 such as, for example, when the retaining member 27 is held in a tray 11. Suitable materials for the flexible membrane include, for example, polypropylene and other plastic type material compounds.

Figure 5:
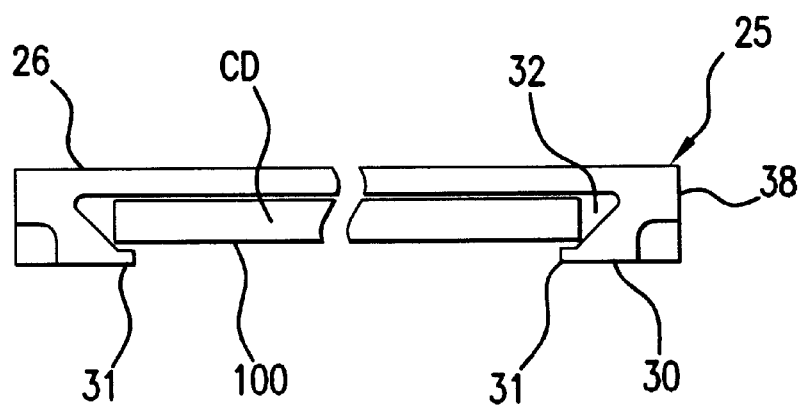
FIG. 5 is a top plan view of the holder member shown in FIG. 3.

Reference now being made to FIGS. 3 and 5, the holder member 25 preferably has a wall 29 and holding elements 30 for holding the compact disc 100 on the body portion 26 of the holder member 25. Each holding element 30 is shown comprising a flange 31 which is configured to define a channel 32. Each flange 31 is shown being disposed on opposite sides of the holder member body portion 26. Alternately, the flange 31 can comprise a continuous member or can be provided as a plurality of separate members which are not continuous.

Optionally, as shown in FIG. 3, an aperture 39 can be formed in the wall 29 of the holder member 25 to provide visibility of the CD, such as, for example, when flipping through several CD's held by holder members 25 which are arranged in a tray 11.

Figure 6:
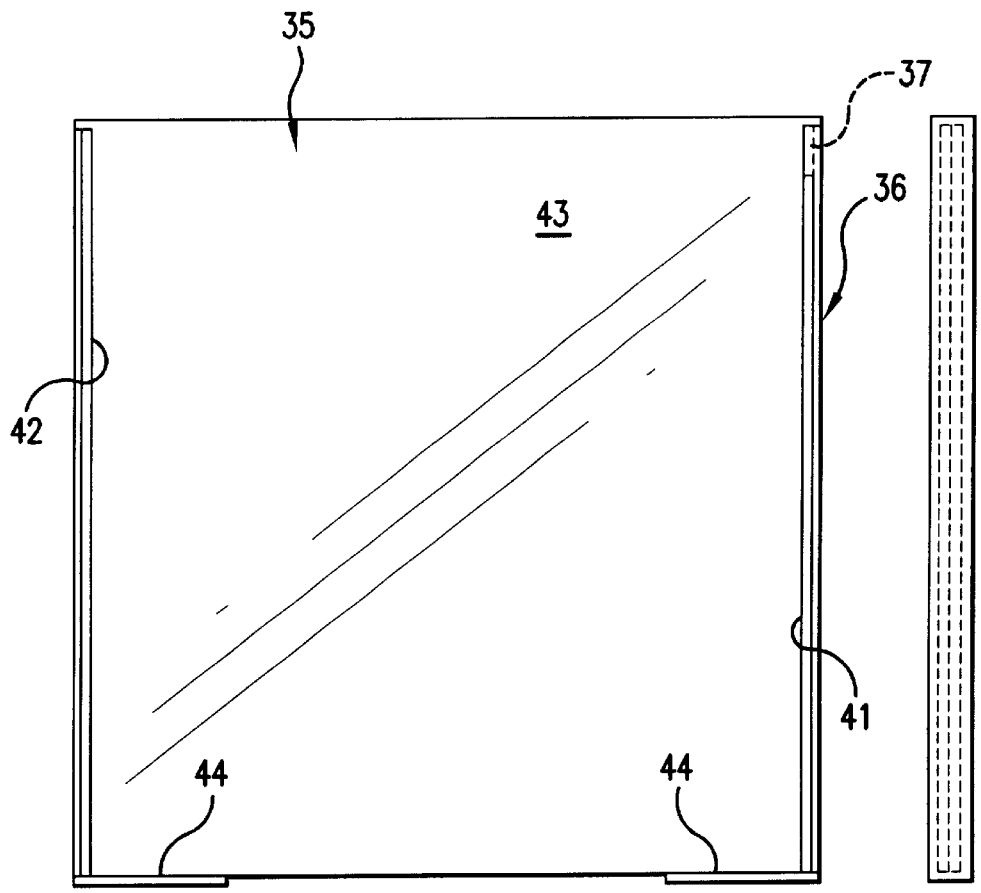
FIG. 6 is a rear elevation view of a second holder member constructed in accordance with the present invention.
Figure 7:
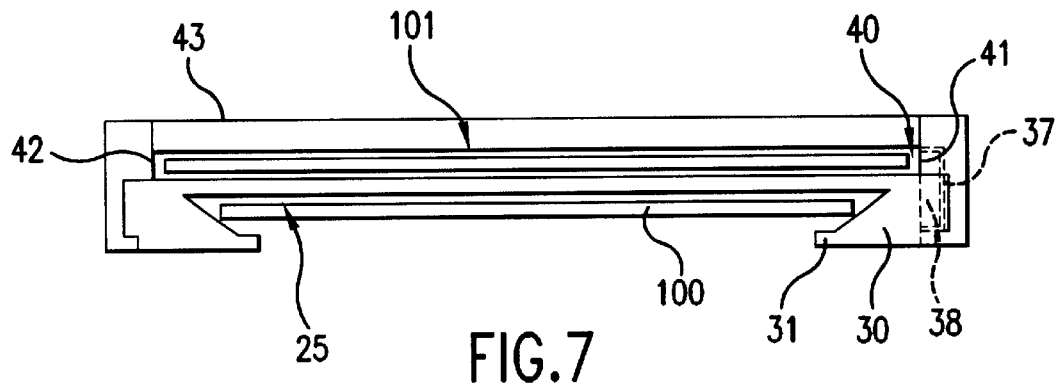
FIG. 7 is a top plan view of the holder member shown in FIG. 6.

Reference now being made to FIGS. 6 and 7, there is illustrated holding means for holding a compact disc, wherein the holding means comprises a second holder member 35 having a body portion 36 for holding a compact disc, such as, for example, the disc 100, as well as information about the disc, such as, for example, a cover or jacket identifying the compact disc. Attachment means connect the second holder member 35 with the holder member 25. Preferably, the second holder member 35 has attachment means for attaching the second holder member 35 to the holder member 25. The attachment means is shown comprising a mounting recess 37 disposed in the second holder member 35 (FIG. 7), which is configured to receive the mounting portion 38 of the holder member 25 (FIG. 5). The first holder member 25 can be used to hold a compact disc 100, or can be attached to a second holder member 35 to enable additional material, such as, for example, compact disc literature, such as the jacket and/or insert 101. The second holder member 35 when attached to the first holder member 25 forms a pocket 40 in which the literature 101 can be held. Preferably, the pocket 40 is defined by sidewalls 41, 42, and a front face 43, and a bottom wall or ledge portion 44. Preferably, the front face of the second holder member 35 is comprised of a clear material to provide visibility of the contents 101 held by the holder member 35. Preferably, the second holder member 35 is configured to be in the front when the unit of the first holder member 25 and second holder member 35 are attached and placed in the tray 11 with other holder members 25, 35, so that the user may view the literature 101 from the front to readily identify the corresponding compact disk, which preferably is stored behind it.

Figure 8:
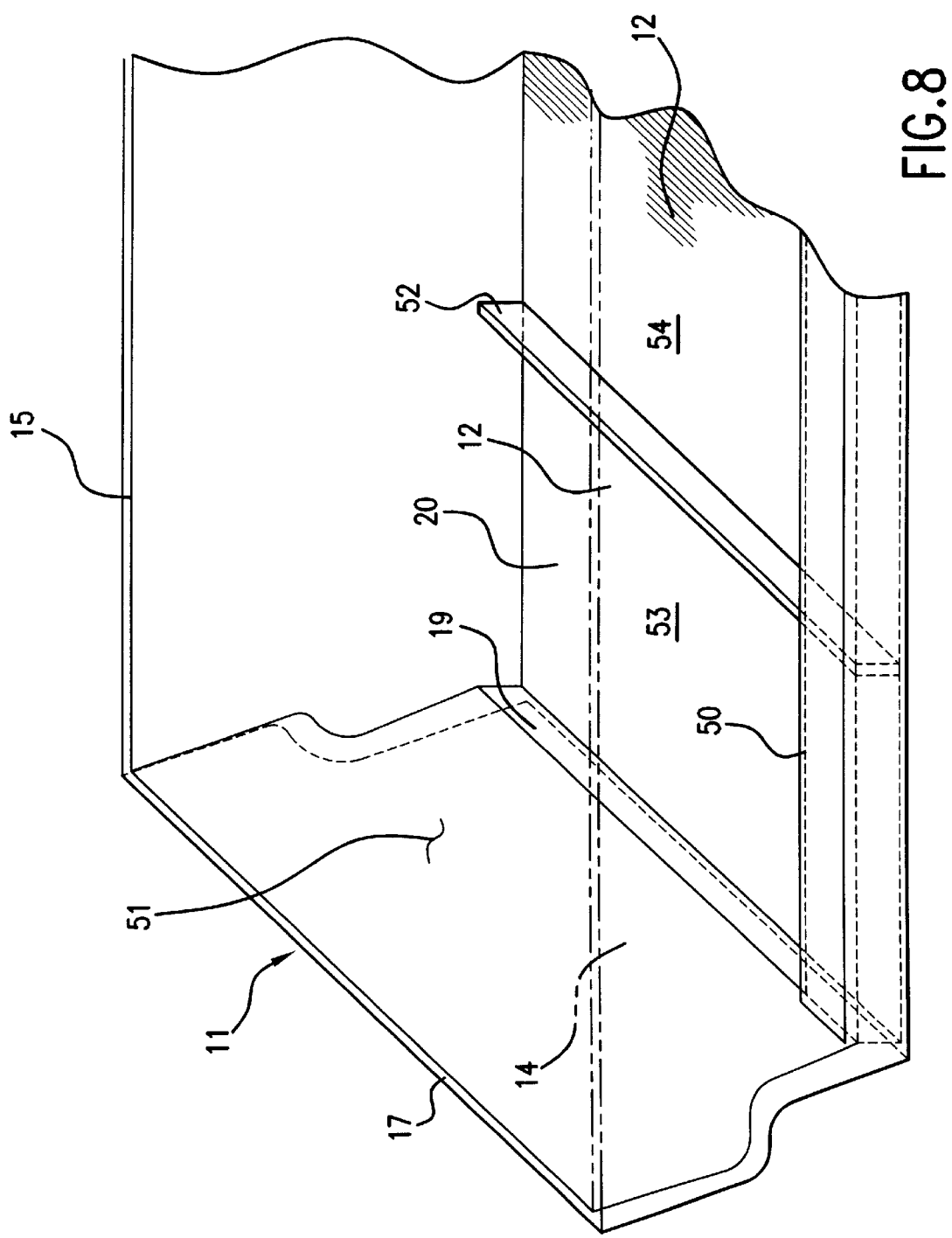
FIG. 8 is a parallel perspective, partial view of the tray shown in FIG. 2.

Retaining means is provided to releasably secure the holder member 26 to a supporting structure, such as, for example the tray 11. The retaining means preferably may comprise a retaining member 27, as illustrated in FIGS. 3 and 4. The retaining member 27 preferably is configured for selective attachment to a supporting structure. While shown as a tray 11, it will be understood that the supporting structure can comprise a rack, shelf, plate, cabinet, or other suitable member. The tray 11 is provided with a bottom 12 which is configured to receive the retaining member 27. As shown in FIG. 8, the tray 11 has securing means for securing the holder member 25. The securing means is shown comprising a flange 50 disposed in the internal compartment 51 of the tray 11, and on one side thereof, disposed longitudinally from the front of the tray to the rear of the tray 11. The retaining member 27 is configured for releasably locking engagement with the flange 50 to secure the holder member 25 on the tray 11.

Holder members 25 may be installed in the tray 11 by placing the retaining member first end 55 under the tray flange 50, and lowering the second end 56 of the retaining member 27 into the tray bottom 12 to secure the holder member 25 in the tray 11. In the preferred embodiment shown in FIGS. 3 and 4, the retaining member first end 55 is provided having a tapered configuration for facilitating insertion of the first end 55 under the tray flange 50. Preferably, alignment means is provided for facilitating the alignment of adjacent holder members 25 when positioned in the tray 11. The alignment means is shown comprising a dimple 56 located on the retaining member 27 which facilitates the securing of a holder member 25 in the tray 11.

The securing means may optionally include spacing means for facilitating the holding of a predetermined number or group of holder members 25 within the tray. The spacing means preferably is shown comprising spacer stays 52 which are provided between the first sidewall 14 and the second sidewall 15. The spacer stays 52 preferably are spaced from each other to define a section, such as, for example, the first section 53 and second section 54. A plurality of holder members 25 can be installed in each respective section 53, 54. The spacer means permits a section of the tray 11 to be used with holder members 25, without the need to fill the entire tray 11 with holder members 25. A plurality of holder members 25 may be installed in the first section 53, between the front stay wall 19 of the tray 11 and the stay 52 shown in FIG. 8. Optionally, additional holder members 25, may be installed in additional sections, such as, for example, the second section 54, as the need for additional compact disc storage arises. In addition, if desired, the entire tray 11 can be filled with holder members 25. It will also be understood that holder members 25 can be installed in sections other than the first section 53, as the user desires, therefore enabling the user to determine which section or sections of the tray 11 to utilize.

Referring to FIGS. 3 and 4, there is shown the retaining member 27 having a tapered end 55. It will be understood that when a second holder member 35 is attached to a first holder member 25, it will be preferred to view the second holder member 35 from the front of the supporting structure, such as the tray 11, that is, so that the information 101 faces the user and facilitates locating the corresponding compact disc which preferably is stored in the attached first holder member 25. In order to accomplish this, although not shown, the retaining member taper can be provided on the second end 56. Alternately, the tray flange 50 may be configured for positioning on the right or left side of the tray 11. For example, while not shown, instead of being integral, the flange 50 can comprise a detachable component which is positionable on either the right or the left side of the tray 11.

Referring again to FIGS. 3 and 4, there is illustrated biasing means for biasing the holder member 25 to a preferred position for facilitating viewing of a compact disc, such as the disc 100 shown in broken-line representation, or corresponding compact disc jacket held by the second holder member 35 (FIGS. 6 and 7). The biasing means facilitates the movement of the holder member 25 forward or rearward in relation to other holder members to make that holder member 25, or a next successive or adjacent holder member in the tray 11, visible so that the CD or its corresponding identification material, such as, for example, the information 101 which may also held by the second holder member 35 is readily identifiable. The biasing means is shown preferably comprising a flexible connecting member 60 having a spring action. The connecting member 60 connects the holder body portion 26 with the retaining member 27. As shown best in FIG. 4, the connecting member 60 preferably has a protrusion 61, shown at a rest position, which through flipping of the holder member 25, occupies a second rest position 60' represented by the broken line illustration in FIG. 4.

Figure 9:
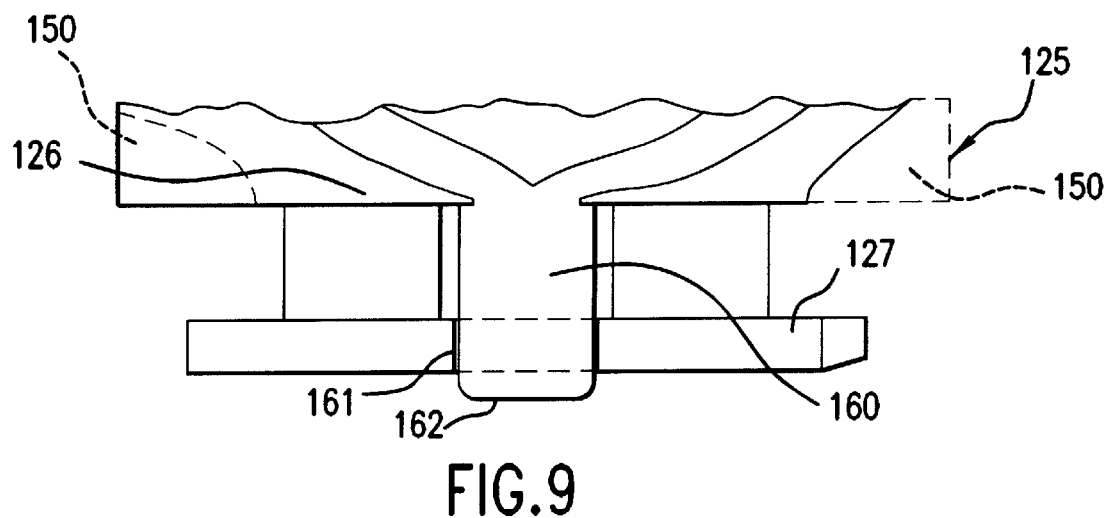
FIG. 9 is a front elevation, fragmentary view of a first alternate embodiment of a holder member constructed in accordance with the present invention.
Figure 10:
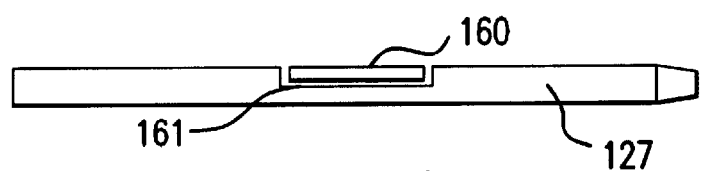
FIG. 10 is a bottom plan view of the holder member shown in FIG. 9.

Referring to FIGS. 9 and 10, a first alternate embodiment of a holder member 125 is shown comprising a flexible tab 160. The holder member 125 preferably may be constructed the same as the holder member 25 described herein, but having a retaining member 127 with a slot or recess 161 disposed therein, and biasing means comprising a flexible tab 160 having one end which is connected to the holder body portion 126. The flexible tab 160 is disposed in the slot or recess 161 of the retaining member 127. Although not shown, the leading edge 162 of the tab 160 preferably undergoes compression when the holder member 125 is installed in a tray 11. The flexible tab 160 preferably bows when the holder member 125 is installed in a tray 11 so that the holder member 125 is biased one way or the other (i.e. forward or rearward in the tray 11), in order to facilitate viewing of the items held with the holder member 125. Preferably, as described herein, a second holder member 35 is adapted to be optionally attached to the holder member 125 to provide an additional storage space.

Alternately, while not shown, it will be understood that the flexible tab 160 may be connected to the retaining member 127 to bow the tab 160 and thereby provide a biasing effect on the holder member body portion 126.

Figure 11:
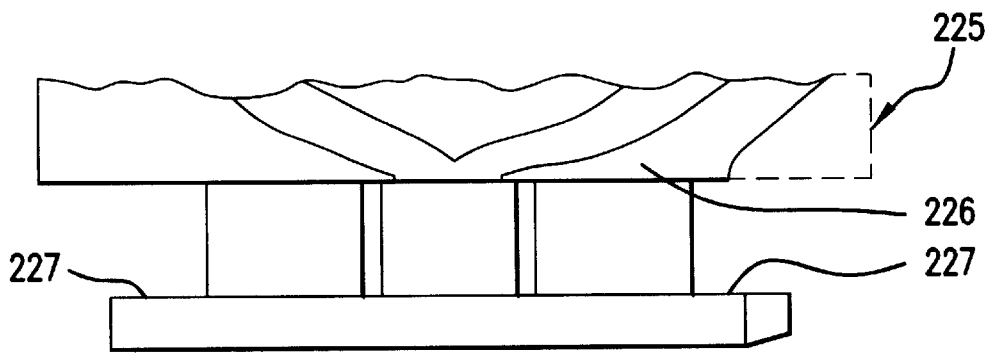
FIG. 11 is a front elevation, fragmentary view of a second alternate embodiment of a holder member constructed in accordance with the present invention.
Figure 13:
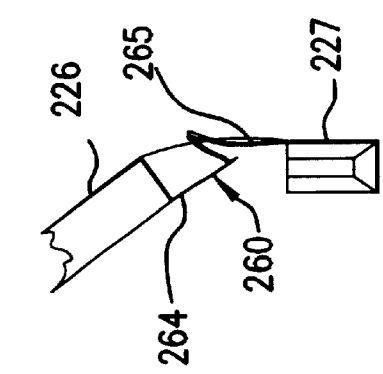
FIG. 13 is a right side elevation view of the holder member shown in FIG. 11, shown in the relaxed condition.
Figure 12:
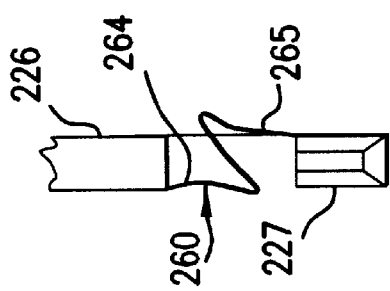
FIG. 12 is a right side elevation view of the holder member shown in FIG. 11, shown in the stretched condition.

Referring to FIGS. 11–13, a second alternate embodiment of a holder member 225 is shown comprising a flexible member illustrated as a generally z-shaped member 260. The holder member 225 preferably may be constructed the same as the holder member 25 described herein, but having biasing means comprising a generally z-shaped member 260 having living hinges. Preferably, the member 260 is illustrated having a first end 264 which is connected to the holder body portion 226, and a second end 265 which is connected to the retaining member 227. The member 260 facilitates biasing of the holder body 226 one way or the other (i.e. forward or rearward in the tray 11) in order to facilitate viewing of the items held with the holder member 125. Preferably, as described herein, a second holder member 35 is adapted to be optionally attached to the holder member 225 to provide an additional storage space.

Figure 15:
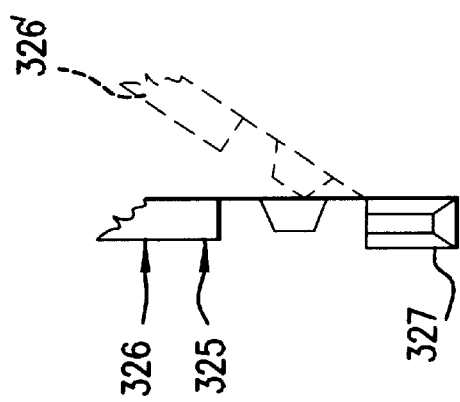
FIG. 15 is a right side elevation view of the holder member shown in FIG. 14, the holder member being illustrated in the relaxed condition.
Figure 14:
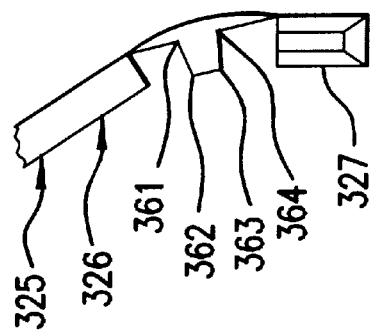
FIG. 14 is a right side elevation view of a third alternate embodiment of a holder member constructed in accordance with the present invention, the top of the holder member being shown broken away, the holder member being illustrated in the relaxed condition.

Reference now being made to FIGS. 14 and 15, a third alternate embodiment of a holder member 325 is shown comprising a flexible member illustrated as a living spring member 360 configured having living hinges 361, 362, 363, 364 which are biased to a rest position shown in FIG. 14, wherein the holder member body portion 326 is biased in one direction in order to facilitate viewing of the items held with the holder member 325. In FIG. 15, the holder member body 326 is shown in a generally vertical position, where the biasing living spring member 360 is flexed and from which the member 360 is biased to return to the position shown in FIG. 14, thereby facilitating the positioning of the holder member body portion 326. Similarly, while not shown, it will be understood that, if the holder member body portion 326 shown in FIG. 15 is moved in the opposite direction of that shown in FIG. 14 (to the right as viewed in FIG. 15, or rearward if installed in a tray 11) then the living spring member 360 returns to its rest state causing the holder member body portion 326 to move rearward to the position illustrated as 326. Preferably, as described herein, a second holder member 35 is adapted to be optionally attached to the holder member 325 to provide an additional storage space.

Figure 16:
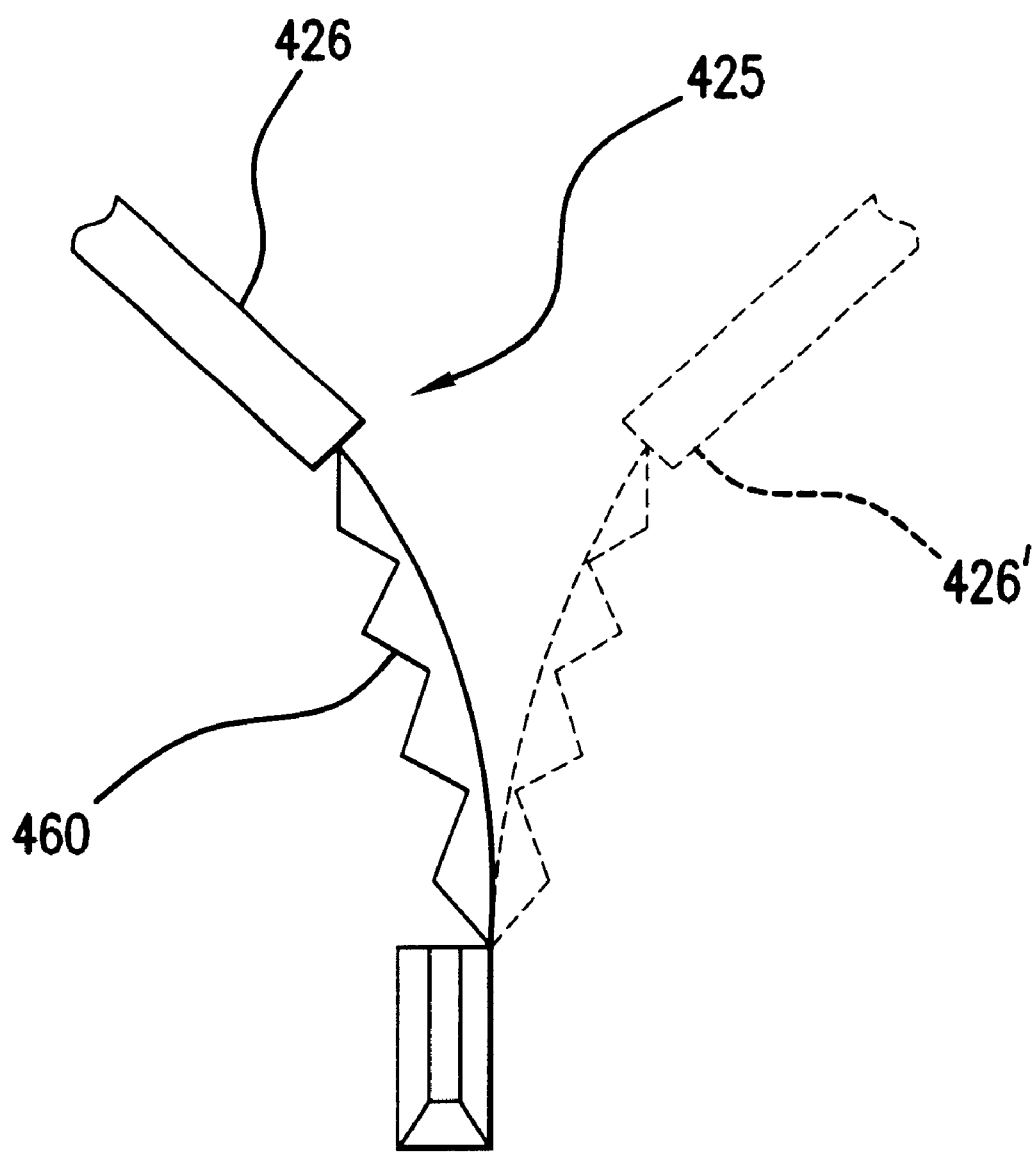
FIG. 16 is a right side elevation view of a fourth alternate embodiment of a holder member constructed in accordance with the present invention, the top of the holder member being shown broken away, the holder member being illustrated in the relaxed condition.

Referring to FIG. 16, there is shown a fourth alternate embodiment of a holder member 425 comprising a flexible member illustrated as a living spring member 460 which is biased to a rest position, as shown, wherein the holder member body 426 is biased in one direction in order to facilitate viewing of the items held with the holder member 425. When the holding member body 426 is moved in the opposite direction of that shown in FIG. 16 (to the right as viewed in FIG. 16, or rearward if installed in a tray 11) then the living spring member 460 returns to its rest state causing the holder member body 426 to move rearward to the position illustrated as 426'. Preferably, as described herein, a second holder member 35 is adapted to be optionally attached to the holder member 425 to provide an additional storage space.

It will be understood that the biasing means provided in accordance with the present invention may facilitate the viewing of a compact disc or the viewing of the information held by a second holder member, or both. The biasing means preferably biases a holder member to a position to make the contents of the biased holder member or that of an adjacent holder member more readily visible to a user.

It will be further understood that the holder member constructed in accordance with this invention, preferably, is configured to hold a compact disc, or other media discs, such as a digital video disc as well as the related jacket or information corresponding to the disc title or contents. In this manner, in the preferred configuration, the information is held on the front face 43 of the second holder body 36 and the CD is held on the first holder member, such as the holder member 25.

In addition, alternately, the lower corners, such as, for example, those 150, shown in connection with the holder member 125 of FIG. 9, may be provided as curved or angled members, as represented by the broken line portions. It will be understood that holder members 25, 225, 325 and 425 may be constructed with this feature, if desired.

These and other advantages will be understood from a reading of the background of the invention, the summary of the invention, the brief description of the drawing figures, the detailed description of the preferred embodiments, and the appended claims. The invention is to be broadly construed in accordance with the disclosure herein.

What is claimed is:

1. A device for holding and storing compact discs, comprising:
   (a) holding means for holding at least one compact disc;
   (b) a supporting structure for supporting said holding means;
   (c) flexible means for facilitating the flipping of said holder means, wherein said flexible means is configured for flexing in a direction parallel to a flipping direction of said holder means, and wherein the holding means comprises a holder member having a body portion, and wherein the device comprises retaining means for removably mounting said holder body portion on said supporting structure.

2. The device of claim 1, wherein said flexible means comprises a flexible membrane.

3. The device of claim 1, wherein said holding means comprises a first holder member and a second holder member, and attachment means for attaching said second holder member with said first holder member.

4. The device of claim 1, wherein said holding means comprises a body portion and a flange portion for holding a compact disc on said body portion.

5. The device of claim 4, wherein the flange portion comprises a first flange portion and a second flange portion which define with the body portion a groove for holding a compact disc.

6. The device of claim 1, further comprising biasing means for biasing the holding means to a forward or rearward position.

7. The device of claim 1, wherein said supporting structure comprises a tray.

8. The device of claim 7, wherein said holder means comprises a retaining member adapted to be removably secured to said tray, and wherein said tray is adapted to hold the retaining member.

9. The device of claim 7, wherein said tray has a flange disposed longitudinally on one side thereof, and wherein said retaining member is configured with a tapered end portion for releasably holding engagement with said flange to secure said holder means on said tray.

10. The device of claim 1, wherein said supporting structure comprises a tray, and wherein said holding means comprises a plurality of holder members for holding compact discs.

11. A device for holding and storing compact discs, comprising:
 (a) holding means for holding at least one compact disc;
 (b) a supporting structure for supporting said holding means;
 (c) flexible means for facilitating the flipping of said holder means;
 (d) wherein the holding means comprises a holder member having a body portion, and wherein the device comprises retaining means for removably mounting said holder body portion on said supporting structure.

12. The device of claim 11, wherein said flexible means comprises a flexible membrane connecting said holder body portion with said retaining means.

13. The device of claim 12, wherein said flexible membrane comprises at least one leg element.

14. The device of claim 12, wherein said flexible membrane comprises a first leg element and a second leg element which are spaced apart from each other.

15. The device of claim 11, wherein said retaining means comprises a retaining member for retaining said holder member body portion on a supporting structure, with connecting means for connecting said holder body with said retaining member, wherein said connecting means comprises at least one flexible leg member.

16. The device of claim 15, wherein said connecting means comprises a plurality of flexible leg members which are spaced apart from each other.

17. The device of claim 11, wherein said retaining means comprises a retaining member adapted to be removably mounted to said supporting structure.

18. A device for holding and storing compact discs, comprising:
 (a) holding means for holding at least one compact disc;
 (b) a supporting structure for supporting said holding means;
 (c) flexible means for facilitating the flipping of said holder means;
 (d) wherein said holding means comprises a first holder member and a second holder member, and attachment means for attaching said second holder member with said first holder member.

19. The device of claim 18, wherein said first holder member is adapted to hold a compact disc and wherein the second holder member is adapted to hold information.

20. The device of claim 18, wherein said second holder member has a pocket formed therein for storing information.

21. The device of claim 18, wherein said first holder member comprises a holder body portion with a holder element for holding a compact disc, and wherein said second holder member comprises a second holder element for holding compact disc information.

22. The device of claim 18, wherein said first holder member has a mounting portion, and wherein said second holder member has a recess, wherein said second holder member connects with said first holding member by positioning said mounting portion in said recess.

23. A device for holding and storing compact discs, comprising:
 (a) holding means for holding at least one compact disc;
 (b) a supporting structure for supporting said holding means;
 (c) flexible means for facilitating the flipping of said holder means;
 (d) further comprising biasing means for biasing the holding means to a forward or rearward position.

24. The device of claim 23, wherein said holder member comprises a body portion, and wherein said biasing means comprises a flexible connecting member having a spring-like action for biasing the holder member body portion to a forward or rearward orientation to facilitate identifying a compact disc held by the holding means.

25. The device of claim 23, wherein the holding means comprises a holder member having a body portion, wherein the device comprises retaining means for removably mounting said holder member body portion on said supporting structure, wherein said biasing means comprises a flexible tab having a first end which is connected to the holder member body portion and a second end which is adapted for engagement with a supporting structure, wherein said retaining member has a recess disposed therein for the flexible tab, said flexible tab being configured to bow when installed so that the holder member body portion is biased in one of a first direction and a second for facilitating viewing of a compact disc held with the holder member.

26. The device of claim 23, wherein the biasing means comprises a generally z-shaped flexing member.

27. The device of claim 23, wherein the holding means comprises a holder member having a body portion, wherein the device comprises retaining means for removably mounting said holder body portion on said supporting structure, and wherein the biasing means comprises a living spring member having a first end connecting with said holder body portion and a second end connecting with said retaining member.

28. A device for holding and storing compact discs, comprising:

(a) holding means for holding at least one compact disc;
(b) a supporting structure for supporting said holding means;
(c) flexible means for facilitating the flipping of said holder means;
(d) wherein said supporting structure comprises a tray;
(e) wherein said holder means comprises a retaining member adapted to be removably secured to said tray, and wherein said tray is adapted to hold the retaining member.

29. The device of claim 28, wherein said retaining member has a stay dimple disposed thereon for engagement with a retaining member of an adjacent holder member.

30. A device for holding and storing compact discs, comprising:
(a) holder means for holding a compact disc;
(b) a supporting structure for supporting said holder means, said supporting structure comprising a tray;
(c) wherein said holder means comprises flexible means for facilitating the flipping of said holder means;
(d) wherein the holder means comprises a first holder member for holding a compact disc and second holder member for holding information; said first holder member having a body portion adapted to hold a compact disc;
(e) biasing means for biasing the holder to a forward or rearward position, said biasing means comprising a flexible member;
(f) retaining means for retaining said first holder member body portion on a supporting structure, wherein said retaining means comprises a retaining member adapted to be removably mounted to a supporting structure;
(g) wherein said flexible means connects said first holder member body portion with said retaining member, and wherein said flexible means comprises a first flexible membrane element and a second flexible membrane element spaced apart from said first flexible element;
(i) biasing means for biasing the first holder member body portion to a forward or rearward position to facilitate identifying the compact disc held by the holding means, said biasing means comprising a flexible member connecting said holder member body portion with said retaining means, wherein said flexible member has a spring action for biasing the first holder member body portion to a forward or rearward orientation; and
(j) wherein said tray comprises a flange disposed longitudinally on one side thereof, and wherein said retaining member is configured for releasably locking engagement with said flange to secure said holder means on said tray.

31. A device for holding and storing compact discs, comprising:
(a) holding means for holding at least one compact disc;
(b) a supporting structure for supporting said holding means;
(c) flexible means for facilitating the flipping of said holder means;
(d) wherein said supporting structure comprises a tray;
(e) wherein said tray has a flange disposed longitudinally on one side thereof, and wherein said retaining member is configured with a tapered end portion for releasably holding engagement with said flange to secure said holder means on said tray.

* * * * *